US008751420B2

(12) United States Patent
Hjelm et al.

(10) Patent No.: US 8,751,420 B2
(45) Date of Patent: Jun. 10, 2014

(54) GENERIC REASONER DISTRIBUTION OF RESOURCES USING A PLURALITY OF SHALLOW REASONERS, AND A PREDICTOR SERVER

(75) Inventors: Johan Hjelm, Tokyo (JP); Takeshi Matsumura, Toyko (JP); Bo Xing, Fremont, CA (US); Andrew Ton, San Jose, CA (US); Shingo Murakami, Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 250 days.

(21) Appl. No.: 13/437,794

(22) Filed: Apr. 2, 2012

(65) Prior Publication Data

US 2013/0262366 A1    Oct. 3, 2013

(51) Int. Cl.
G06F 15/18    (2006.01)

(52) U.S. Cl.
USPC .......................................................... 706/12

(58) Field of Classification Search
USPC ..................... 706/12, 45, 62; 709/223, 224
See application file for complete search history.

(56) References Cited

U.S. PATENT DOCUMENTS

| | | | |
|---|---|---|---|
| 6,263,358 B1* | 7/2001 | Lee et al. ....................... 718/100 |
| 7,424,701 B2* | 9/2008 | Kendall et al. ................ 717/105 |
| 7,606,785 B1* | 10/2009 | Shirriff ........................... 706/59 |
| 2002/0107962 A1* | 8/2002 | Richter et al. ................ 709/225 |
| 2005/0197995 A1* | 9/2005 | Badt et al. ......................... 707/1 |
| 2006/0090165 A1* | 4/2006 | Martin et al. ................. 719/318 |
| 2006/0091999 A1* | 5/2006 | Howarth ...................... 340/10.3 |
| 2011/0078231 A1* | 3/2011 | Oliver et al. .................. 709/203 |
| 2012/0330875 A1* | 12/2012 | Angele ........................... 706/47 |

OTHER PUBLICATIONS

*OMA Device Management Protocol*; http://www.openmobilealliance.org/ftp/Public_documents/DM; May 15, 2012.
Leinberger, W., et al., "Multi-Capacity Bin Packing Algorithms, with Applications to Job Scheduling under Multiple Constraints", http://glaros.dtc.umn.edu/gkhome/node/74; May 27, 1999.
Zhang, J., et al., "Job-Scheduling with Resource Availability Prediction for Volunteer-Based Grid Computing", http://www.ee.ucl.ac.uk/lcs/previous/LCS2009/LCS/lcs09_25.pdf; 2009.

* cited by examiner

*Primary Examiner* — David Vincent
(74) *Attorney, Agent, or Firm* — Blakely, Sokoloff, Taylor & Zafman LLP

(57) ABSTRACT

A method for improving distribution of resources for a reasoning system including a plurality of data sources that each generate raw data that is to be processed by shallow reasoners before being provided to other components of the reasoning system to generate high-level inferred conclusions, the method including the steps of discovering available data sources from the plurality of data sources by discovery of protocol modules executed by devices associated with each data source; collecting capability information from each protocol module for each associated device; sending the capability information to a predictor server; requesting a resource allocation plan from the predictor server; and receiving the resource allocations plan from the predictor server, the resource allocation plane identifying devices associated with the plurality of data sources for executing shallow reasoners, the devices selected based on a usage model and the capability information.

15 Claims, 4 Drawing Sheets

GENERIC REASONER DISTRIBUTION OF RESOURCES USING A PLURALITY OF SHALLOW REASONERS, AND A PREDICTOR SERVER

FIELD OF THE INVENTION

The embodiments of the invention relate to a method and system for distributing reasoning system resources. Specifically, the method and system of the invention monitors available resources and generates a resource allocation plan.

BACKGROUND

Decreasing costs for computing devices and computing components has led to their widespread use in many products and environments. These environments with many computing devices are referred to as pervasive computing environments. With the rapid growth of pervasive computing environments, computer-based reasoning systems are increasingly being deployed to help manage these environments and distill useful information from them. These reasoning systems process a data set that is collected from a range of data sources within the pervasive computing environment, and the reasoning system infers high-level conclusions from this data set. The conclusions are made available and are used for further appropriate actions to be taken without human intervention. For example, a real-time reasoning system can process a stream of data that constantly is being received, and the reasoning system needs to draw and expose conclusions in the shortest time possible to keep up with the constant update of the data stream.

A variety of reasoning mechanisms and a variety of combinations of these reasoning mechanisms have been employed by reasoning systems including, Fuzzy logic, Bayesian logic, rules-based reasoning, case-based reasoning, and semantic reasoning. Some of these reasoning mechanisms consist roughly of a rule set and a mechanism for applying this rule set to raw data. Some other reasoning mechanisms such as semantic reasoning use semantic web technologies, to pose a structured data format that contains restrictions on what it is possible to do with the input data.

The performance of a reasoning system varies significantly depending on many factors. One of them is that the reasoning mechanisms constituting the system have very different characteristics in terms of processing power and memory capacity, which also depends on the processor and other computing resources available. Another notable factor is the availability of data from the data sources. Inconsistent update frequencies from data sources or broken connectivity between the data sources and the reasoning system can be the cause of unavailability, intermittent availability or delayed availability of data for a reasoning system.

One example environment for reasoning systems is machine-to-machine environments. In machine-to-machine environments, a group of simple computing devices are able to communicate through a communication network. This results in data streams that are generated at many different machines as raw data streams. These data streams are brought together to make sense of these data streams so that appropriate actions can be promptly and automatically taken by other machines in the network. However, the ability to make use of and act on the raw data is constrained by the heave resource requirements at a central processing system that collect the raw data.

SUMMARY

A method is presented for improving the distribution of resources for a reasoning system. The reasoning system is in communication with a plurality of data sources that each generate raw data that is to be processed by shallow reasoners before being provided to other components of the reasoning system to generate high-level inferred conclusions. This method comprises a set of steps. The steps include discovering available data sources from the plurality of data sources by the discovery of protocol modules executed by devices associated with each data source. The steps also include collecting capability information from each protocol module for each associated device. The capability information is sent to a predictor server and a resource allocation plan is requested from the predictor server. The steps further include receiving the resource allocations plan from the predictor server, where the resource allocation plane identifies the devices associated with the plurality of data sources for that are to execute shallow reasoners, where the devices are selected based on a usage model and the capability information.

A computer system is presented for improving the distribution of resources for a reasoning system. The reasoning system is in communication with a plurality of data sources that each generate raw data that is to be processed by shallow reasoners before being provided to other components of the reasoning system to generate high-level inferred conclusions. The computer system comprises a processing device executing a discovery module, protocol management module, and a resource allocations management module. The discovery module discovers available data sources from the plurality of data sources by discovery of protocol modules executed by devices associated with each data source. The protocol management module collects capability information from each protocol module for each associated device. The resource allocation management module sends the capability information to a predictor server to obtain a resource allocation plan from the predictor server that identifies devices associated with the plurality of data sources for executing shallow reasoners, the devices selected based on a usage model and the capability information.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
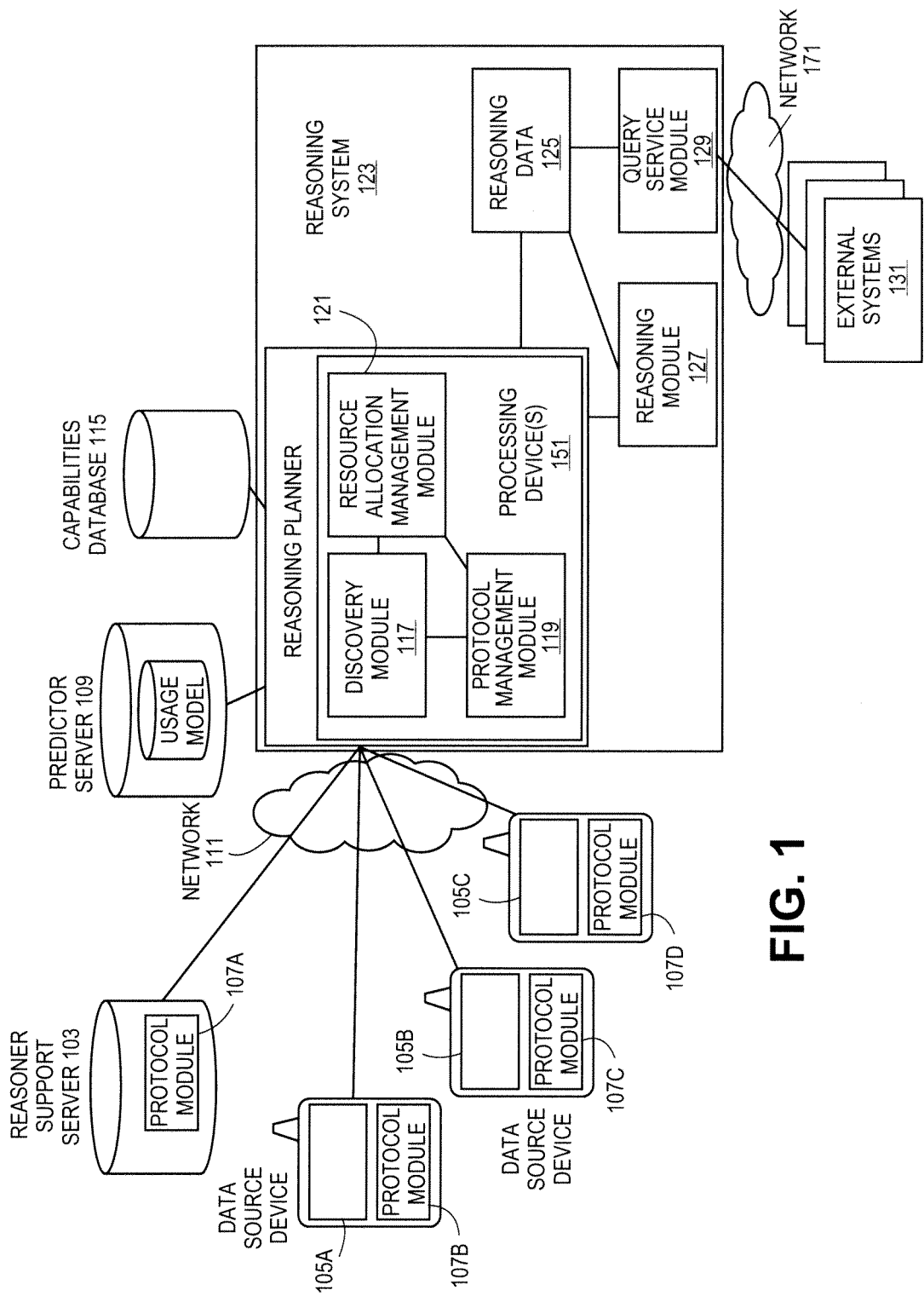
FIG. 1 is a diagram of one embodiment of a reasoning system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams in the attached Figures will be described with reference to the exemplary embodiments shown in the attached Figures. However, it should be understood that the operations of the flow diagrams can be performed by embodiments of the invention other than those discussed with reference to the attached Figures, and the embodiments discussed with reference to the diagrams in the attached Figures can perform operations different than those discussed with reference to the flow diagrams of the attached Figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. A 'set,' as used herein, refers to any positive whole number of items. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video).

Data sources as used herein refer to any type of data collected by or generated by devices that are capable of communicating the data over a network as a data stream. The devices can include appliances, console devices, handheld devices, meters, sensors, scientific instruments and similar devices. The data sources can communicate over any number or type of networks including wireless, near field communication, optical, wired or similar networks. The data sources can produce any amount of data at any frequency or rate. The data generated or collected by the data sources is typically basic in nature, such a temperature reading, an activation state, sensor input or similar data. The data can be initially collected as either analog or digital information and transported over the network in either an analog or digital format. The data can be transmitted using any type or combination of communication protocols including machine-to-machine communication protocols.

The embodiments of the present invention provide a method and system for avoiding the disadvantages of the prior art. The prior art systems are not capable of discerning the capabilities of the devices within the system. As a result, it is not possible to distribute the load amongst the devices of the system to maximize their utility in collecting and analyzing data within the system. The system is then less able to process the data streams from the data sources within the system to arrive at higher level conclusions based on these data streams because the system is not maximizing the available computing resources to apply reasoning logic such as shallow reasoning and ontology reasoning to the data streams.

For example, in a system, such as a mobile telecommunications system, where sensor information is generated at many different points simultaneously, and brought together into one central point to draw conclusions from it, various mechanisms are required to speed up the processing, minimize the load on the central system, enable conclusions to be drawn from partial data, etc. If the nodes providing the information are not persistent, but can come and go, it is important to be able to leverage the aggregated capabilities of the current collection of devices while each is available.

Some systems can schedule jobs depending on the predicted time for performing processing (i.e., the capabilities of the device) and the reliability of the resource (i.e., the likelihood that it will remain on the network). In these systems, a central scheduling node handles the prediction of the reliability, the capabilities information, and the allocation of jobs accordingly.

In one embodiment, general/central reasoning logic can be used to draw conclusions from an ontology which is powerful but slow, essentially forming a bottleneck for all reasoning. On the other hand, if ontological reasoning could be performed at many disconnected points simultaneously without excessive overhead, there is a risk of inconsistencies in the processed ontology. A middle way is to distribute processing which does not act on the ontology or similar higher logic level, but on the raw data using a set of heuristics, such as fuzzy logic or Bloom filters. In particular, when it comes to data which has not yet been turned into an ontology or similar higher logic format, it is often more expedient to use a different kind of reasoning logic. This type of reasoning logic consists roughly of a rule set and a means of applying this rule set to the raw data and can be referred to as a shallow reasoner. However, this can be done in many different ways.

The distribution of tasks between resources in a network can based on their presented information, when applied to reasoning, this presents some particular problems. The reasoning tasks can be highly specialized and have to be associated with one another in a deterministic sequence to ensure coherency and proper processing (e.g., it is not possible to do shallow reasoning after the reasoning on an ontology). Thus, distributing reasoning tasks associated with ontology reasoning or similar higher logic reasoning across a set of resources must be properly managed to ensure coherency and sequential function.

The embodiments of the invention overcome these disadvantages of the prior art by distributing shallow reasoners and similar reasoning logic amongst a plurality of devices in communication with the reasoning system to execute the shallow reasoning prior to the forwarding of the raw data to the reasoning system. A set of protocol modules are installed on each of the plurality of devices to report on the available resources and load at each device to enable the reasoning system to distribute shallow reasoning tasks and similar reasoning tasks to each of the available devices according to their capabilities and load. The embodiments enable the system to automatically rebalance itself when new data sources become available. It also enables the allocation of shallow reasoning to the most suitable nodes, offloading the higher level logic (e.g., ontology) server and speeding up processing.

The embodiments enable the transformation of a raw data set from the data sources into a set of derived conclusions in a format that enables the derivation of further conclusions from it. The format used can be any structured format such as a relational database. In a relational database, the format is a table with fixed data types for each cell, and the conclusions in the relational database tables can be accessed in the form of SQL queries or programs that can access the database through an API.

In an example embodiment of the Semantic Web, the tool of the transformation data is an ontology, which is a structured data format that contains restrictions on what it is possible to do with the data, i.e. whether it is possible for a generic reasoning component—which does not have to be pre-programmed with a set of fixed rules—to draw conclusions from the data.

FIG. 1 is a diagram of one embodiment of a system for distributing reasoning methods for a reasoning system over available resources. The system includes a reasoning system 123 in communication with a set of data source devices 105A-105C, a reasoned support server 103, a predictor server 109 and a capabilities database 115. The reasoning system 123 can also be in communication with any number of other external systems 131. The reasoning system 123 can communicate with other devices and systems over a set of networks 111, 171. These networks 111, 171 can be local area networks (LANs), wide area networks (WANs), such as the Internet, or similar communication networks. The communication networks 111, 171 can include any number of intermediate devices including network elements such as routers or other computing devices. The communication across the networks 111, 171 can be through any communication medium including optical, wired, wireless, similar communication mediums and any combination thereof.

The reasoning system 123 can be a computing device such as a workstation, server, or similar computing device or a set of such devices working in coordination with one another. The reasoning system 123 can include any number of processors 151 that execute the components of the reasoning system including a reasoning planner 101. The reasoning system can also encompass reasoning data 125, reasoning modules 127, and query service module 129. The processors 151 can also manage these modules in conjunction with working memory and local storage and peripheral devices.

The reasoning planner 101 is the component that manages the optimization of the reasoning process so that conclusions are available when they are requested by external systems 131 through the query service module 129 or similar interface with minimal delay. In one embodiment, the reasoning planner 101 includes a set of sub-components including a discovery module 117, a resource allocation management module 121 and a protocol management module 119. The reasoning planner 101 communicates with the protocol modules 107A-107D to determine the capabilities of the other devices in communication with the reasoning planner 101, to determine their ability to perform reasoning tasks and to schedule the use of their resources for these tasks. The reasoning planner 101 also communicates with predictor server 109 and capabilities database 115 and reasoner support server 103.

The reasoner support server 103 is a server or similar machine that can execute a protocol module 107A as well as reasoning logic such as shallow reasoners, ontology reasoning and similar reasoning tasks to carry out the function of the reasoning system 123. Any number of reasoner support servers 103 or resources managed by such reasoner support servers 103 can be utilized by the reasoning system 123 to carry out the reasoning functions of the reasoning system.

The discover module 117 functions to communicate over the network 111 or similar networks to identify available protocol modules 107A-107C and establish communication with these protocol modules 107A-107C. The protocol modules 107A-107C report the capabilities of the devices 105A-105C that are executing the protocol modules 107A-107C. The protocol modules 107A-107C can also manage the communication of raw data to the reasoning system 123 as well as the administration of reasoning distributed to the associated device 105A-105C.

The protocol management module 119 directs the protocol modules 107A-107C to instantiate and tear down the local reasoning logic or tasks such as shallow reasoners that have been assigned to the associated devices 105A-105C according to the resource allocation plan generated by the resource allocation management module 121. The protocol management module 119 can use any communication medium or protocol for communicating with the protocol modules 107A-107C. The communication between the protocol management module 119 and the protocol modules 107A-107C can also be a secured communication channel. The capabilities information that is received from the protocol modules 107A-107C can be stored in the capabilities database 115 by the protocol management module 119. The protocol modules 107A-107C can report capabilities at regular intervals or in response to queries or polling from the protocol management module 119.

The resource allocation management module 121 coordinates the distribution of reasoning tasks amongst the available resources by generating and implementing a resource allocation plan. The resource allocation management module 121 queries a predictor server 109 that generates or maintains a usage model 113. The usage model 113 is a representation of the distribution of resources in the network 111 and devices 105A-105C for servicing the reasoning functions of the reasoning system 123. The predictor server 109 generates and updates the usage model 113 using the data from the capabilities database 115 that is maintained by the protocol management module 119 based on data received from the protocol modules 107A-107C. The usage model 113 or a subset of the usage model 113 is returned to the resource allocation management module 121 as a resource allocation plan. The resource allocation management module 121 then issues commands to the protocol management module 119 to instantiate or tear down reasoning functions at particular devices 105A-105C through the agency of the associated protocol module 107A-107C.

The reasoning logic executed by the reasoning system 123 and the devices 105A-105C, which are in communication with the reasoning system 123, can include shallow reasoners, ontological reasoners and similar reasoning logic. Shallow reasoners perform reasoning for a specific data type, data source, or related information. These shallow reasoners take raw data, such as sensor readings, positional information or similar information from sources such as sensors or other data generation mechanisms at the devices 105A-105C and process the raw data to make simple inferred conclusions based on the raw data. For example, a global positioning reading can be processed to determine that the associated device is moving or within a particular geographic area, this conclusion is then reported to the reasoning system rather than the raw data. There can be any number of shallow reasoners that are supported within in a single device. Each shallow reasoner can process locally generated data or remotely generated data. The shallow reasoners can process the same raw data for separate purposes or in support of separate functions or higher level reasoning processes.

In each device 105A-105C that potentially can execute a shallow reasoner, there is a functional module which handles the communication about the allocation of the shallow reasoners with the protocol management module 119 of the reasoning planner 101 referred to herein as the 'protocol module' 107A-107C. The protocol module 107A-107C continuously reports the capabilities and usage (load) of the device 105A-105C where it is instantiated to the protocol management module 119 of the reasoning planner 101. When a device 105A-105C is overloaded, for example when the device 105A-105C needs resources for other processing tasks that are given higher priority by the operating system of the device 105A-105C, e.g., user-interactive applications, the shallow reasoners can be migrated to other locations (e.g., other devices 105A-105C or reasoned support servers 103). This transfer is effected by the protocol module 107A-107C of the associated device sending an update of the resource utilization or capabilities of the affected device 105A-105C to the protocol management module 119 of the reasoning planner 101, which in turn updates the capabilities database 115. The update of the capabilities database 115 results in the updating of the usage model 113 by the predictor server 109. The updated usage model 113 then causes the resource allocation plan to indicate that some of the shallow reasoners assigned to an overburdened device 105A-105C be redistributed by sending a tear down command to the overburdened device 105A-105C. In one embodiment, the protocol module 107A-107C can also contain a device management component, which allows it to install or tear down instances of shallow reasoners.

In another embodiment, a protocol module can also be executed by a device that is not a data source, but is close to one or more data sources and is capable of executing reasoning logic. For example, in an example embodiment of a home automation scenario, there are data sources such as a thermostat, garage door sensor, humidity sensor, sprinkler system sensor, and similar sources. Some of these data sources can be 3G/4G connected, while some others are connected through a wireless (Wi-Fi/ZigBee/Z-Wave) home gateway. In this example embodiment, the home gateway can have a protocol module in it, which reports its capabilities and runs shallow reasoning for the data sources connected to it as allocated.

The predictor server 109 can be executed by a separate server, workstation or similar computing device. The predictor server 109 can be in communication with the reasoning system 123 over any type of network or can be co-located with the reasoning planner 101. The predictor server 109 generates predictions for likely load on devices 105A-105C and data sources, determining how many shallow reasoners as well as the type of shallow reasoner that should be active and in which devices 105A-105C based on capability information stored in the capability database 115. The capability information can include processor or memory usage information, battery status, connectivity and similar information about the devices 105A-C.

Other aspects of the reasoning system 123 can include reasoning data 125, reasoning modules 127, query service modules and similar components. These components carry out higher order inference and logic that is applied to the intermediate results provided to the reasoning system by shallow reasoners executed by the devices 105A-105C. The reasoning data 125 can be a storage structure for the received intermediate results as well as further intermediate results and inferred conclusions that are derived from the reported data. This additional data is stored or organized according to a data structure such as a conclusion tree, ontology or similar data structure as is suited to the reasoning process being applied to the received data.

The reasoning being applied to the received data can be structured as a reasoning module 127. The reasoning system 123 can employ any number of reasoning modules 127 to execute reasoning processes on the received data to generate higher level inferred conclusions in coordination with reasoning data 125. These higher level conclusions can be persisted in separate data structures or within the reasoning data 125. The higher level conclusions can then be made accessible to other devices and systems through a query service module 129.

The query service module 129 can be any type of data retrieval service that receives queries with any type of protocol or messaging from external systems 131. These external systems 131 can be local to the reasoning system 123 or remote from the reasoning system and communicating over a network 171. The query service 129 retrieves the requested data from the reasoning data 125 and provides it to the external systems 131 as requested.

Figure 2:
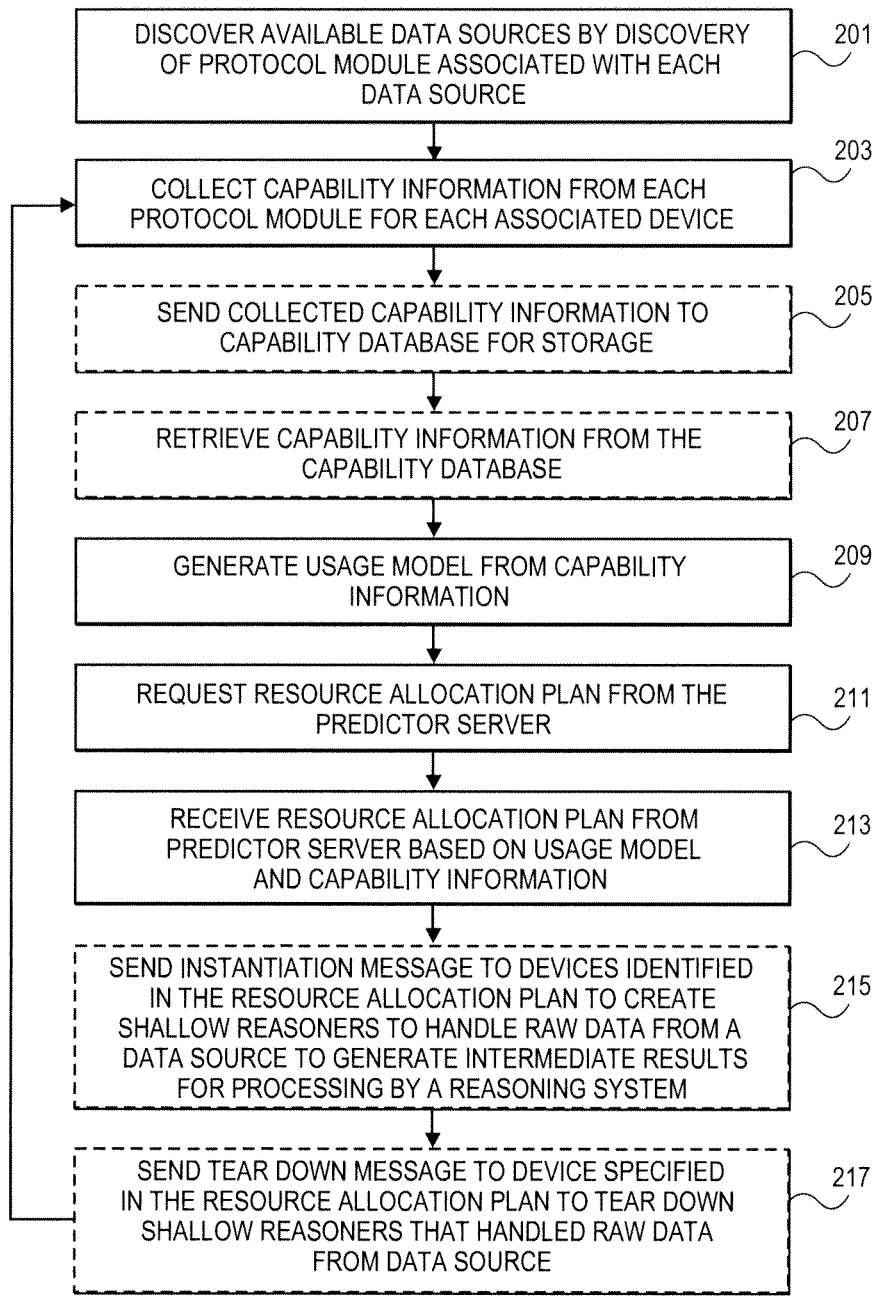
FIG. 2 is a flowchart of one embodiment of a process for distributing resources for a reasoning system.

FIG. 2 is a flowchart of one embodiment of the automated reasoning distribution system. The process can be initiated by the reasoning system to start a discovery process to determine the available devices and establish communication with the protocol modules of the devices (Block 201). The reasoning system can advertise its presence on a network and/or the protocol modules can advertise their existence over the network to initiate the communication. The reasoning system through the protocol management module or the protocol modules can respond to the advertisement to establish the connection between the two components. The discovery process can be handled using the network discovery process of Wi-Fi devices, UPnP discovery, an intentional naming system, or other suitable means by which one unit in a network discovers other units in the network. The protocol modules on each of the devices can be instantiated during the start-up of the respective devices.

After the protocol modules have been discovered and a connection established, the protocol modules can be polled or can self-report their capabilities (Block 203). The capability information can include any amount of information about the data sources provided by the devices, any amount of information about the devices or similar information. The information about the devices can include processing capabilities, memory availability, storage capacity, usage schedules and similar information. In one embodiment, the capabilities information includes performance-related information such as the available memory, processor speed and operating system, other resource-consuming processes operating on the device, and the capacity of the network interface(s) of the device. Similarly, information about the data source can include type information, timing and scheduling information and similar information about the data sources. The protocol management module of the reasoning planner can use the protocol module in each device to continuously collect the capabilities information from the discovered devices and data sources. This can be done as a part of the discovery process, or as a separate process.

The collected capability information is sent by the protocol management module to the capability database for storage (Block 205). The capability database can store the data in any format or data structure including a relational database, an object oriented database or similar storage structure. The capability data can then be retrieved from the capability database by the predictor server (Block 207). The predictor server can process the capability information to generate a usage model (Block 209). In one embodiment, the usage model can be derived from device and system history information (e.g., historical usage information) through machine learning or it can be created by a subscription provider, registration operator, or a third party. The usage model represents the assumed patterns of device interaction in communication with the reasoning system. For example, depending on the assumed behaviors of a service client such as a user of a set of devices, the usage model can represent the usage of a network and devices on the network by an administrator or a group of users or similar pattern of interaction with devices in communication with a reasoning system. Different behavior models will result in different predictions. The usage model describes how the user or set of users will use the device(s), e.g., whether a user will leave the house in 15 minutes, whether the user will switch off the device in an hour, whether the battery of a device is about to run out and how long it will last with the current usage, and similar usage patterns. The usage model, in turn, can be used to generate a resource allocation plan that can be provided to the resource allocation management module of the reasoning planner. Further, the usage model can reflect the potential usage of the available devices to serve as a cache, storage location, processor or similar resource. This potential usage information includes the potential length of usage, the potential of the device remaining in the same location for a duration of time, the importance of the function that is occupying the device resources and other factors that affect the availability of the device, such as the likelihood that it will be charged when the battery is low.

The resource allocation management module can request that the predictor server generate the resource allocation plan (Block 211). The resource allocation plan can have any form and cover any subset of the available resources including an allocation plan for a single resource up to a resource plan for all available resources. The resource allocation plan can be based on any subset of the available capability information (Block 213). The resource allocation plan can also take into account whether a particular device has an appropriate amount of source data (e.g., sensor data) to be processed, that is whether there is sufficient raw data to be processed by reasoning logic such as a shallow reasoner to justify the instantiation of the reasoning logic on the device in light of the resources it will consume on the device and the overhead involved in instantiating the reasoning logic.

In one embodiment a prediction model is executed where available resources in communication with the reasoning system are available to consume tasks in the form of the set of reasoning logic to be distributed. If resource requirement and availability are defined as a single value that is a function of all considered factors (e.g., battery, bandwidth, memory), then it is a single-capacity scheduling problem. In another embodiment, different factors can be separately considered, and then the prediction model is a multi-capacity scheduling problem. Further, if there is more than one location to distribute reasoning logic to, it is a multi-shop distribution problem. As a generalization, the prediction model can model the problem as a multi-capacity multi-shop distribution problem. These types of problems are known to be NP-hard, and any of a set of heuristics for addressing the identification of sub-optimal solution (but since the problem is NP-hard, not for finding the optimal solution) can be applied. Each of the solutions can be analyzed by the prediction server by various means, such as competitive analysis. For many algorithms, performance is dependent not only on the size of the inputs, but also on their values. One such example is the quicksort algorithm, which sorts an array of elements. Such data-dependent algorithms are analyzed for average-case and worst-case data. Competitive analysis is a way of doing worst case analysis for on-line and randomized algorithms, which are typically data dependent.

Since the distribution of data which is to be concluded by the distributed reasoners is not known in advance, the problem of distribution could be seen as an aspect of competitive analysis, where the meta-analysis concerns the fit of the algorithm and data to the resource available. Hence, it lends itself to competitive analysis. In competitive analysis, one imagines an "adversary" that deliberately chooses difficult data, to maximize the ratio of the cost of the algorithm being studied and some optimal algorithm. Adversaries range in power from the oblivious adversary, which has no knowledge of the random choices made by the algorithm pitted against it, to the adaptive adversary that has full knowledge of how an algorithm works and its internal state at any point during its execution. Note that this distinction is only meaningful for randomized algorithms. For a deterministic algorithm, either adversary can simply compute what state that algorithm must have at any time in the future, and choose difficult data accordingly. In one embodiment, the "adversary" does not exist as such, but is represented by the potential outcomes given variations of the usage model and context data.

The capability information collected from each device consists of information relevant to the situation surrounding the device. This information can be collected from sensors in the device, such as its position sensor, motion sensor, or similar data sources; or from the network (where available), such as the position, position history, devices in the vicinity, or similar information.

The different ways of reasoning can have different requirements in terms of processing power, memory capacity, and similar requirements, which also depend on the processor and other computing resources available. Furthermore, the update frequency of the data itself will affect the usage model, as data which is less frequently updated can work with a lower latency link from the data source to the ontology store.

In particular, it is possible to distribute the processing of the raw data from the data sources (e.g., the processing done by shallow reasoners) and apply different types of specialized reasoning mechanisms to this. In one embodiment, it is assumed that there is a multitude of shallow reasoners of different types that are distributed in the available devices where raw data originates, whereas there is may only be one central server (i.e., the reasoning system), where the heavy reasoning on data is performed. However, this is only one example deployment. One skilled in the art would understand that other configurations are possible consistent with the principles and structures described herein. Some devices are able to handle some types of reasoning logic, but not other types of reasoning logic. Some types of reasoning logic have to be allocated to a specific type of device, for instance a reasoning support server.

The embodiments of the reasoning system can also divide a potentially big, complex, and resource-consuming reasoning task into smaller pieces and create a sub-task tree. Applied this way, the reasoning distribution method includes dividing a big and/or complex reasoning task, determining each subtask's requirements, and assigning the subtask to reasoning logic. In one example embodiment, the reasoning logic corresponding to the root sub-task can be an ontology reasoner.

The reasoning logic is thus able to be instantiated in the most suitable devices (i.e. they can be instantiated in the devices where suitable, or the reasoning support server(s) available when suitable). It is also possible to have reasoning support servers that are dedicated to run specific reasoning logic, but which are neither data source devices nor servers that are directly part of the reasoning system. This instantiation can form a logical tree structure.

For example, a method of dividing the reasoning tasks to be performed can be considered as follows: A leaf node of the tree is a sub-task that takes raw data from a data source, derives intermediate results from it, and inputs the results to its parent node in the tree for further reasoning. Each non-leaf node takes intermediate results from all its child nodes and infers one-step-further results. The root node of the tree is the task that draws the final conclusion. Each sub-task in the tree is assigned to a corresponding reasoning logic that can execute the task.

The reasoning logic can be distributed to the available devices or servers which are most suitable using a shared protocol according to the predictions from the prediction server, based on the dependencies in the sub-task tree as well as the capabilities and context of devices and servers (e.g., a root-node reasoning logic such as an ontology reasoner can be distributed as well if appropriate).

In addition, the resource availability can vary depending on the usage of the device. For instance, in a sensor device, one lightweight fuzzy logic reason logic component can be allocated during the normal processing; whereas several hundred reasoning logic components of more complex types can be allocated to a reasoned support server node. Applying competitive analysis allows the prediction server to determine which device (or reasoning support server) is most suitable to handle the reasoning logic (e.g., shallow reasoner(s)) in question, given the data inputs and the reasoner characteristics. A reasoner can be stateful, and based on prognosticated load be relocated between devices before it is done. State can be maintained in the reasoner itself, or in the Reasoning Planner. In that case, the reasoner can resume work immediately after relocation.

The protocol management module can then implement the resource allocation plan by generating messages to the appropriate devices to instantiate shallow reasoners or similar reasoning logic at the device (Block 215). The shallow reasoners or similar logic is configured to handle specific data sources and to process them and provide the intermediate results to the reasoned planner. Similarly the resource allocation plan can designate those shallow reasoners or similar logic that is to be torn down and/or move from one device to another through a set of tear down messages and instantiation messages (Block 217). The protocol management module can facilitate the smooth transition of a shallow reasoned or similar logic module from one device to another. In one embodiment, the instantiation or tear down of reasoning logic such as shallow reasoners can be done through a separate provisioning server, which can be an instantiation of open mobile alliance (OMA) device management mechanisms. This process can be continuous as data is continually collected and the resource allocation updated.

Figure 3:
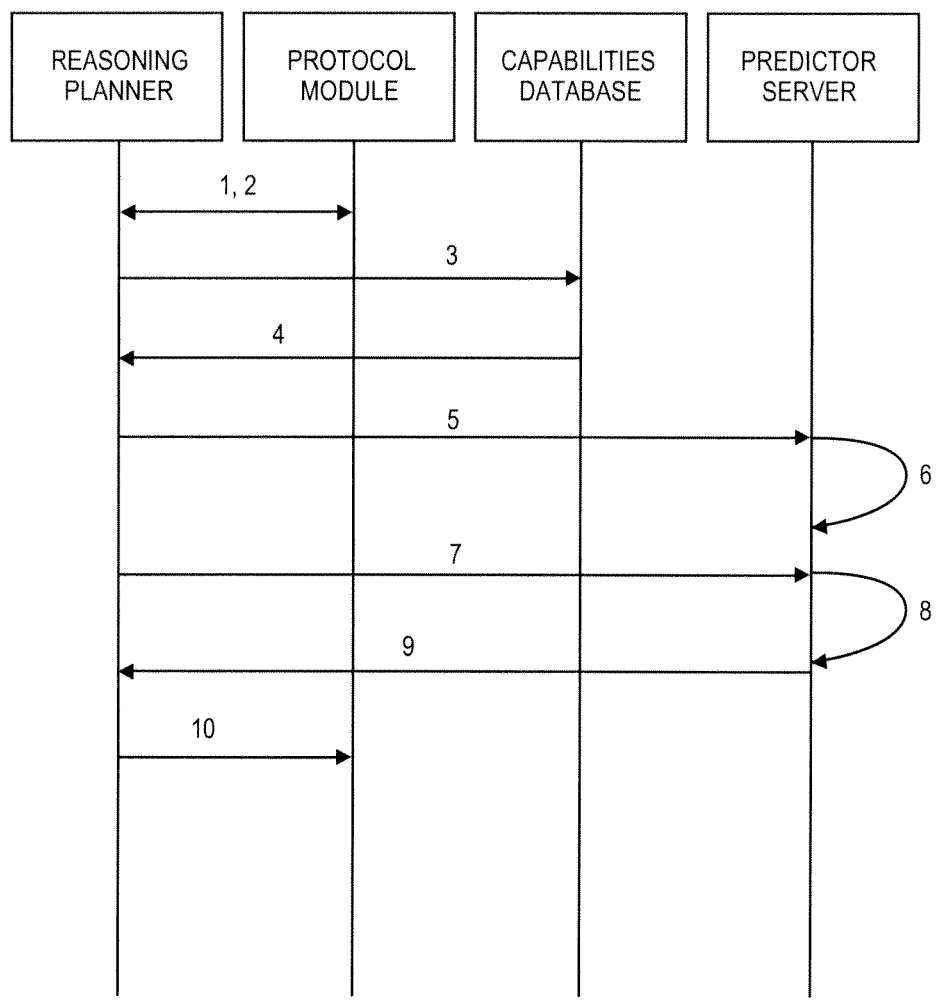
FIG. 3 is a diagram of one embodiment of process timing for the resource distribution process.

FIG. 3 is a timing diagram showing a sequence of the process discussed above in regard to FIG. 2. The timing diagram demonstrates an example sequence of the actions of FIG. 2 as well as presents an example embodiment of the components that are responsible for carrying out the actions. In this example, in action 1 the reasoning planner (or its components) discovers the protocol modules and the associated devices. The reasoning planner in action 2 collects capability information from the protocol modules. In action 3 the reasoning planner stores the collected information in the capabilities database. The capabilities database provides this collected data to the reasoning planner in action 4. The reasoning planner then provides the collected data to the predictor server in action 5.

The predictor server creates a usage model from the collected information in action 6. The reasoning planner requests a resource allocation plan in action 7. The predictor server generates the resource allocation plan in action 8 using the prediction model and the usage model. The resource allocation plan is then returned to the reasoning planner in action 9. The reasoning planner then implements the resource allocation plan by sending the appropriate messages to protocol modules in action 10.

Figure 4:
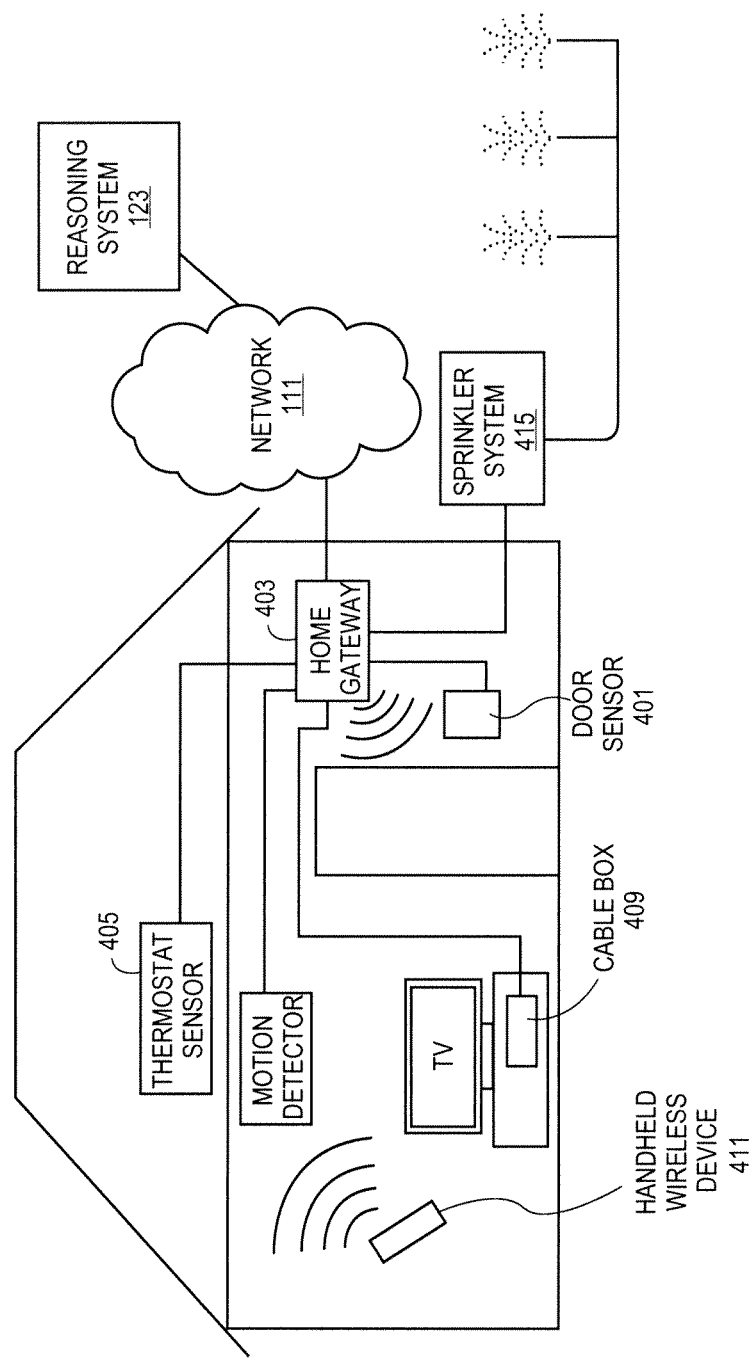
FIG. 4 is a diagram of one example embodiment of the application of the reasoning distribution system in a home automation system.

FIG. 4 is a diagram of one example embodiment of the application of the reasoning distribution system. In this example embodiment, the reasoning distribution system is integrated or utilized to support a home automation system. The home automation system can be managed by a home gateway 403. The home gateway 403 can collect data from a set of sensors in the house and manage some of the associated devices. Each of the devices can execute a protocol module and some subset of the devices can support the execution of shallow reasoners. The sensors as well as the home gateway may or may not have enough processing power to pre-process the raw data generated, depending on processing power, battery status and what other tasks they are running. For those devices that are powerful enough at particular time points, they can run shallow reasoners or similar reasoning logic to generate intermediate results before sending the data to the reasoning system for further aggregation and reasoning.

For example, the home gateway 403 can derive that nobody has been at home for several days, based on raw data from a door sensor, thermostat sensor, motion detector or similar data sources. This intermediate result is sent to the reasoning system 123, which further infers that the family is away on vacation, based on info from the family members' mobile sensors and social sensors (calendar, social network status, and similar data sources). The reasoning system can then auto-program the sprinkler system 415 at the home to run based on local weather info. If the home gateway 403 does not have enough resources at some point, its shallow reasoning tasks can be moved to external reasoning support servers, and the sensors that are capable can send their raw data directly to the reasoning support server.

In this example embodiment, protocol modules can be executed by any subset of the devices in the home automation system. These devices are data sources producing the input data for the reasoning system from which the high order logic can derive conclusions. Each device can be directed by the reasoning system to execute a shallow reasoner or similar reasoning logic. In one embodiment, the reasoning system can be implemented by a server external to the home. In other embodiments, the reasoning system can be implemented within the home gateway 403 or similar local device.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for improving distribution of resources for a reasoning system including a plurality of data sources that each generate raw data that is to be processed by shallow reasoners before being provided to other components of the reasoning system to generate high-level inferred conclusions, the method comprising the steps of:
- discovering available data sources from the plurality of data sources by discovery of protocol modules executed by devices associated with each data source;
- collecting capability information from each protocol module for each associated device;
- sending the capability information to a predictor server;
- requesting a resource allocation plan from the predictor server; and
- receiving the resource allocations plan from the predictor server, the resource allocation plan identifying devices associated with the plurality of data sources for executing shallow reasoners, the devices selected based on a usage model and the capability information.

2. The method of claim 1, further comprising the step of sending collected capability information to a capability database for storage.

3. The method of claim 1, further comprising the step of retrieving the capability information from the capability database to forward to the predictor server.

4. The method of claim 1, further comprising the step of sending an instantiating message to devices identified in the resource allocation plan to create shallow reasoners.

5. The method of claim 1, further comprising the step of sending a tear down message to a device identified in the resource allocation plan to tear down a shallow reasoner.

6. The method of claim 1, wherein the resource allocation plan is updated in response to changes in the capability information.

7. The method of claim 1, wherein the capability information is collected in real-time to dynamically update the resource allocation plan.

8. A computer system for improving distribution of resources for a reasoning system including a plurality of data sources that each generate raw data that is to be processed by shallow reasoners before being provided to other components of the reasoning system to generate high-level inferred conclusions, the computer system comprising:
- a processing device executing a discovery module, protocol management module, and a resource allocations management module,
- the discovery module to discover available data sources from the plurality of data sources by discovery of protocol modules executed by devices associated with each data source,
- the protocol management module to collect capability information from each protocol module for each associated device, and
- the resource allocation management module to send the capability information to a predictor server and to obtain a resource allocation plan from the predictor server that identifies devices associated with the plurality of data sources for executing shallow reasoners, the devices selected based on a usage model and the capability information.

9. The computer system of claim 8, wherein the resource allocation management module requests the resource allocation plan from the predictor server.

10. The computer system of claim 8, wherein the resource allocation management module sends collected capability information to a capability database for storage.

11. The computer system of claim 8, wherein the resource allocation management module retrieves the capability information from the capability database to forward to the predictor server.

12. The computer system of claim 8, wherein the protocol management module sends an instantiating message to devices identified in the resource allocation plan to create shallow reasoners.

13. The computer system of claim 8, wherein the protocol module sends a tear down message to a device identified in the resource allocation plan to tear down a shallow reasoner.

14. The computer system of claim 8, wherein the resource allocation plan is updated in response to changes in the capability information.

15. The computer system of claim 8, wherein the compatibility information is collected in real-time to dynamically update the resource allocation plan.

* * * * *

UNITED STATES PATENT AND TRADEMARK OFFICE
CERTIFICATE OF CORRECTION

PATENT NO. : 8,751,420 B2
APPLICATION NO. : 13/437794
DATED : June 10, 2014
INVENTOR(S) : Hjelm et al.

Page 1 of 1

It is certified that error appears in the above-identified patent and that said Letters Patent is hereby corrected as shown below:

On the title page, item (75), under "Inventors", in Column 1, Line 2, delete "Toyko" and insert -- Tokyo --, therefor.

On the title page, item (57), under "ABSTRACT", in Column 2, Line 14, delete "plane" and insert -- plan --, therefor.

In the Specification

Column 2, Line 4, delete "plane" and insert -- plan --, therefor.

Column 6, Line 11, delete "discover" and insert -- discovery --, therefor.

Column 8, Line 30, delete "query service" and insert -- query service module --, therefor.

Signed and Sealed this
Fourth Day of November, 2014

Michelle K. Lee
*Deputy Director of the United States Patent and Trademark Office*